(12) United States Patent
Gonzalez-Gutierrez

(10) Patent No.: US 10,851,655 B2
(45) Date of Patent: Dec. 1, 2020

(54) FAN

(71) Applicant: ROLLS-ROYCE plc, London (GB)

(72) Inventor: Gabriel Gonzalez-Gutierrez, Derby (GB)

(73) Assignee: ROLLS-ROYCE plc, London (GB)

( * ) Notice: Subject to any disclaimer, the term of this patent is extended or adjusted under 35 U.S.C. 154(b) by 137 days.

(21) Appl. No.: 15/898,973

(22) Filed: Feb. 19, 2018

(65) Prior Publication Data

US 2018/0238174 A1 Aug. 23, 2018

(30) Foreign Application Priority Data

Feb. 20, 2017 (GB) .................................. 1702698.0

(51) Int. Cl.
| | | |
|---|---|---|
| *F01D 5/14* | (2006.01) | |
| *F01D 5/16* | (2006.01) | |
| *F01D 5/28* | (2006.01) | |
| *F04D 29/66* | (2006.01) | |
| *F04D 29/32* | (2006.01) | |

(Continued)

(52) U.S. Cl.
CPC ................. *F01D 5/16* (2013.01); *F01D 5/10* (2013.01); *F01D 5/147* (2013.01); *F01D 5/282* (2013.01); *F01D 5/288* (2013.01); *F02C 3/04* (2013.01); *F04D 29/324* (2013.01); *F04D 29/666* (2013.01); *F04D 29/668* (2013.01); *F05D 2220/32* (2013.01); *F05D 2220/36* (2013.01); *F05D 2240/303* (2013.01); *F05D 2260/96* (2013.01); *F05D 2260/961* (2013.01); *F05D 2300/133* (2013.01); *Y02T 50/672* (2013.01); *Y02T 50/673* (2013.01)

(58) Field of Classification Search
CPC ......... F05D 2240/303; F05D 2260/961; F01D 5/16; F01D 5/282
See application file for complete search history.

(56) References Cited

U.S. PATENT DOCUMENTS

| | | | | |
|---|---|---|---|---|
| 3,628,890 A | * | 12/1971 | Sayre ...................... | F01D 5/282 416/220 R |
| 4,097,192 A | * | 6/1978 | Kulina ...................... | F01D 5/14 416/175 |

(Continued)

FOREIGN PATENT DOCUMENTS

| | | |
|---|---|---|
| CN | 104271888 A | 1/2015 |
| EP | 2599962 | 6/2013 |

(Continued)

OTHER PUBLICATIONS

Great Britain Search Report dated Mar. 31, 2017 issued in GB Patent Application No. 1702698.0.

(Continued)

*Primary Examiner* — Ninh H. Nguyen
(74) *Attorney, Agent, or Firm* — Oliff PLC

(57) ABSTRACT

A fan for a gas turbine engine, the fan comprising a first set of fan blades and a second set of fan blades arranged circumferentially around a hub. Each of the fan blades of the first and second set comprises an organic matrix composite body and a leading edge member connected to the body. The leading edge member of the first set of fan blades has a mass less than the leading edge member of the second set of fan blades.

12 Claims, 4 Drawing Sheets

(51) Int. Cl.
  *F01D 5/10* (2006.01)
  *F02C 3/04* (2006.01)

(56) References Cited

U.S. PATENT DOCUMENTS

| | | | | |
|---|---|---|---|---|
| 4,118,147 A * | 10/1978 | Ellis | ........................ | B23P 6/005 |
| | | | | 416/224 |
| 5,299,914 A | 4/1994 | Schilling | | |
| 5,474,421 A | 12/1995 | Rossmann | | |
| 6,102,662 A * | 8/2000 | Bost | ...................... | B64C 11/205 |
| | | | | 416/224 |
| 6,379,112 B1 | 4/2002 | Montgomery | | |
| 6,428,278 B1 | 8/2002 | Montgomery et al. | | |
| 6,471,482 B2 | 10/2002 | Montgomery et al. | | |
| 6,843,928 B2 * | 1/2005 | Cline | ......................... | C23F 1/26 |
| | | | | 216/100 |
| 8,024,137 B2 | 9/2011 | Kuehhorn et al. | | |
| 8,043,063 B2 | 10/2011 | Kelly et al. | | |
| 8,858,182 B2 * | 10/2014 | Schwarz | ................... | F01D 5/28 |
| | | | | 416/224 |
| 9,598,966 B2 * | 3/2017 | Klein | ....................... | F01D 5/282 |
| 2013/0142640 A1 | 6/2013 | Houston et al. | | |
| 2013/0170947 A1 | 7/2013 | Kurt-Elli et al. | | |
| 2013/0177427 A1 | 7/2013 | Kayser | | |
| 2014/0030092 A1 | 1/2014 | Heinig et al. | | |
| 2014/0050590 A1 | 2/2014 | Zarimahalleh et al. | | |
| 2015/0139789 A1 | 5/2015 | Schoenenborn | | |
| 2018/0274374 A1 * | 9/2018 | Gimat | ..................... | F01D 5/147 |

FOREIGN PATENT DOCUMENTS

| | | |
|---|---|---|
| EP | 2789802 | 10/2014 |
| EP | 2896791 | 7/2015 |
| EP | 3085893 | 10/2016 |
| WO | 9836966 | 8/1998 |
| WO | 2014130332 | 8/2014 |
| WO | 2014197119 | 12/2014 |

OTHER PUBLICATIONS

Jul. 27, 2020 Office Action issued in Chinese Patent Application No. 201810153645.7.

* cited by examiner

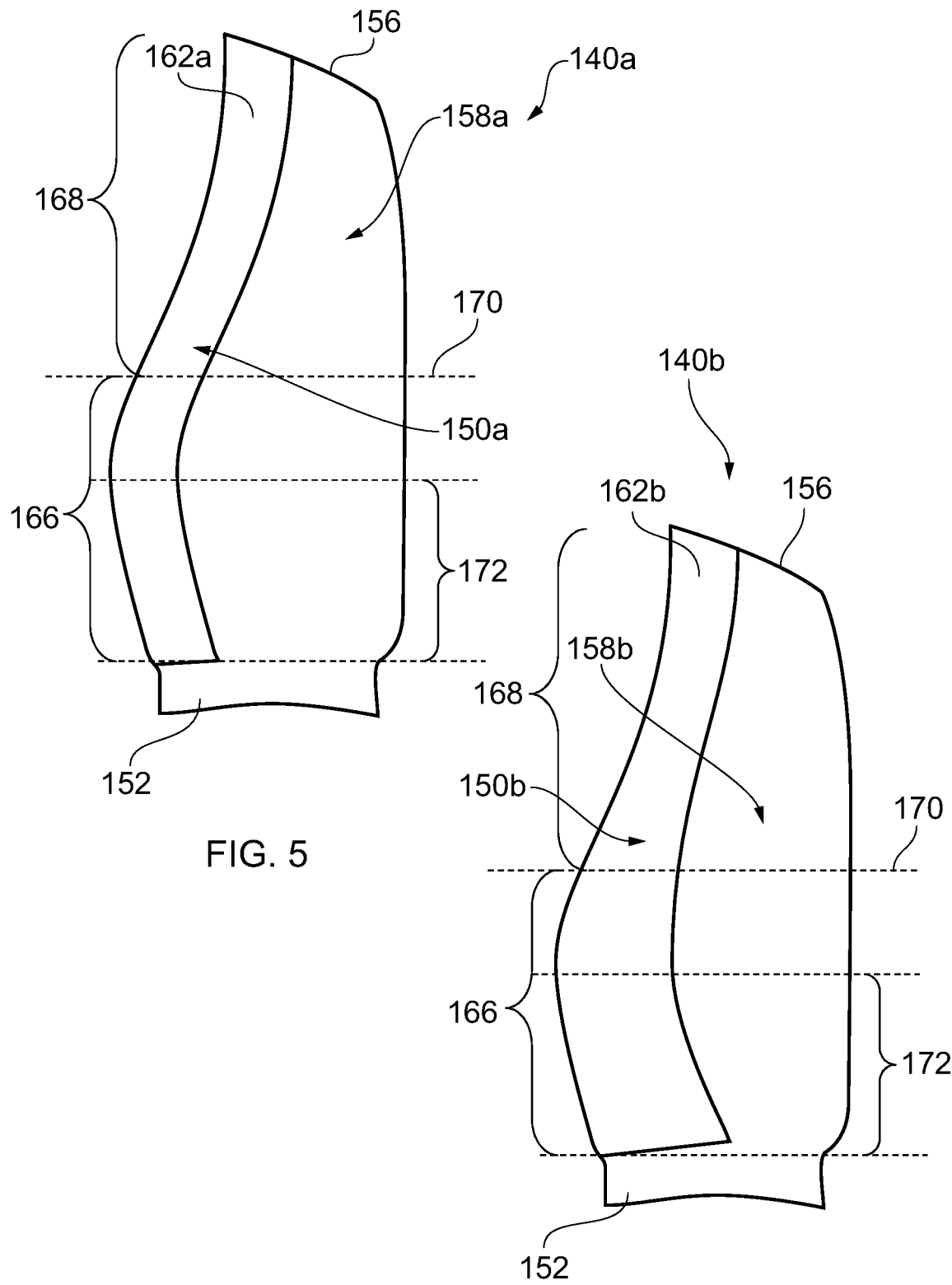

FAN

CROSS-REFERENCE TO RELATED APPLICATIONS

This specification is based upon and claims the benefit of priority from UK Patent Application Number 1702698.0 filed on 20 Feb. 2017, the entire contents of which are incorporated herein by reference.

BACKGROUND

1. Field of the Disclosure

The present disclosure concerns a fan for a gas turbine engine and a gas turbine engine.

2. Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

The fan comprises an array of radially extending fan blades mounted on a rotor. The fan blades may be manufactured from metallic and/or composite (e.g. non-metallic) materials. Composite fan blades generally include a body made from an organic matrix composite material, for example a carbon reinforced resin matrix. Often, the leading edge, and in some cases the trailing edge are reinforced. The reinforcement can be provided by a metallic member that covers the leading or trailing edge of the body.

When fans are designed, they are designed to minimise fan flutter. Fan flutter is a self-excited fan blade vibration phenomenon that can result in fatigue failure of a blade if not sufficiently minimised

SUMMARY

The present disclosure seeks to provide a fan with minimised fan flutter.

According to an aspect there is provided a fan for a gas turbine engine, the fan comprising a first set of fan blades and a second set of fan blades arranged circumferentially around a hub. Each of the fan blades of the first and second set comprises an organic matrix composite body and a leading edge member connected to the body. The leading edge member of the first set of fan blades has a mass less than the leading edge member of the second set of fan blades.

The blades of the first set and of the second set may have the same gas washed surface area, shape and profile.

The volume of the leading edge member of the first set of fan blades may be smaller than the volume of the leading edge member of the second set of fan blades.

The mass of a radially outer portion of the leading edge member of the first set of fan blades may be the same as the mass of a radially outer portion of the leading edge member of the second set of fan blades. The radially outer portion of the leading edge member may extend from a mid-spanwise location of the blade to a tip of the blade.

The mid-spanwise location may be considered to be at a location that is approximately 50% of the total span of the blade.

The mass of a radially inner portion of the leading edge member of the blades of the first set of blades may be less than the mass of a radially inner portion of the leading edge member of the blades of the second set of blades. The radially inner portion may extend from a mid-spanwise location to a root of the blade.

The mass of a root portion of the leading edge member of the first set may be less than the mass of a root portion of the leading edge member of the blades of the second set. The root portion may extend from a spanwise location that is 30% of the total span of the blade to a root of the blade. The remainder of the leading edge member of the blades of the first set of blades may have a mass substantially equal to the remainder of the leading edge member of the blades of the second set of blades (e.g. the mass of a portion extending from the tip to a position adjacent the root portion of the leading edge member may be the same for the blades of the first set of blades and the second set of blades).

The mass of the leading edge member of the second set of fan blades may be increased by providing a leading edge member with a greater volume in the region of greater mass than the fan blades of the first set.

The leading edge member of the first set and the second set may comprise a forward portion that defines a leading edge of the blade, a wing that extends from the forward portion along a suction side of the blade, and a wing that extends from the forward portion along a pressure side of the blade.

The forward portion of the first set of blades may have a lower mass or volume than the forward portion of the second set of blades.

The wings of the first set of blades may have a lower mass and/or volume than the wings of the second set of blades.

The leading edge member may be made from a metallic material.

The leading edge member may be made from steel, titanium or a titanium alloy.

The body may be made from a carbon reinforced resin matrix material.

According to an aspect there is provided a blade for a fan of a gas turbine engine, the blade comprising an organic matrix composite body and a leading edge member connected to the body. The leading edge member has a greater volume in a region proximal the blade root than in a region distal to the blade root.

The leading edge member may comprise a forward portion that defines a leading edge of the blade, a wing that extends from the forward portion along a suction side of the blade, and a wing that extends from the forward portion along a pressure side of the blade.

The forward portion may have a greater volume in a region proximal to the blade root than in a region distal to the blade root.

The wing that extends along the pressure side and/or the wing that extends along the suction side of the blade may have a greater volume in a region proximal to the blade root than in a region distal to the blade root.

The blade may be a blade of the fan of the previous aspect.

According to an aspect there is provided a gas turbine engine comprising the fan or the blade according to the previous aspects.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 5 is a view from the pressure side of a fan blade of a first fan blade set; and FIG. 6 is a view from the pressure side of a fan blade of a second fan blade set.

DETAILED DESCRIPTION OF THE DRAWINGS

Figure 1:
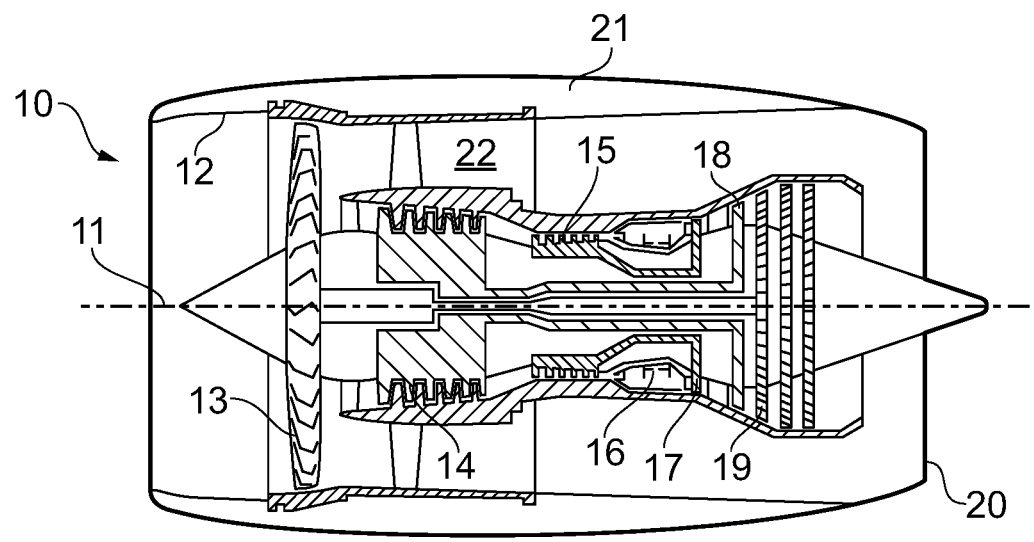
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The fan 13 includes a plurality of fan blades 40 mounted circumferentially around a hub.

Figure 2:
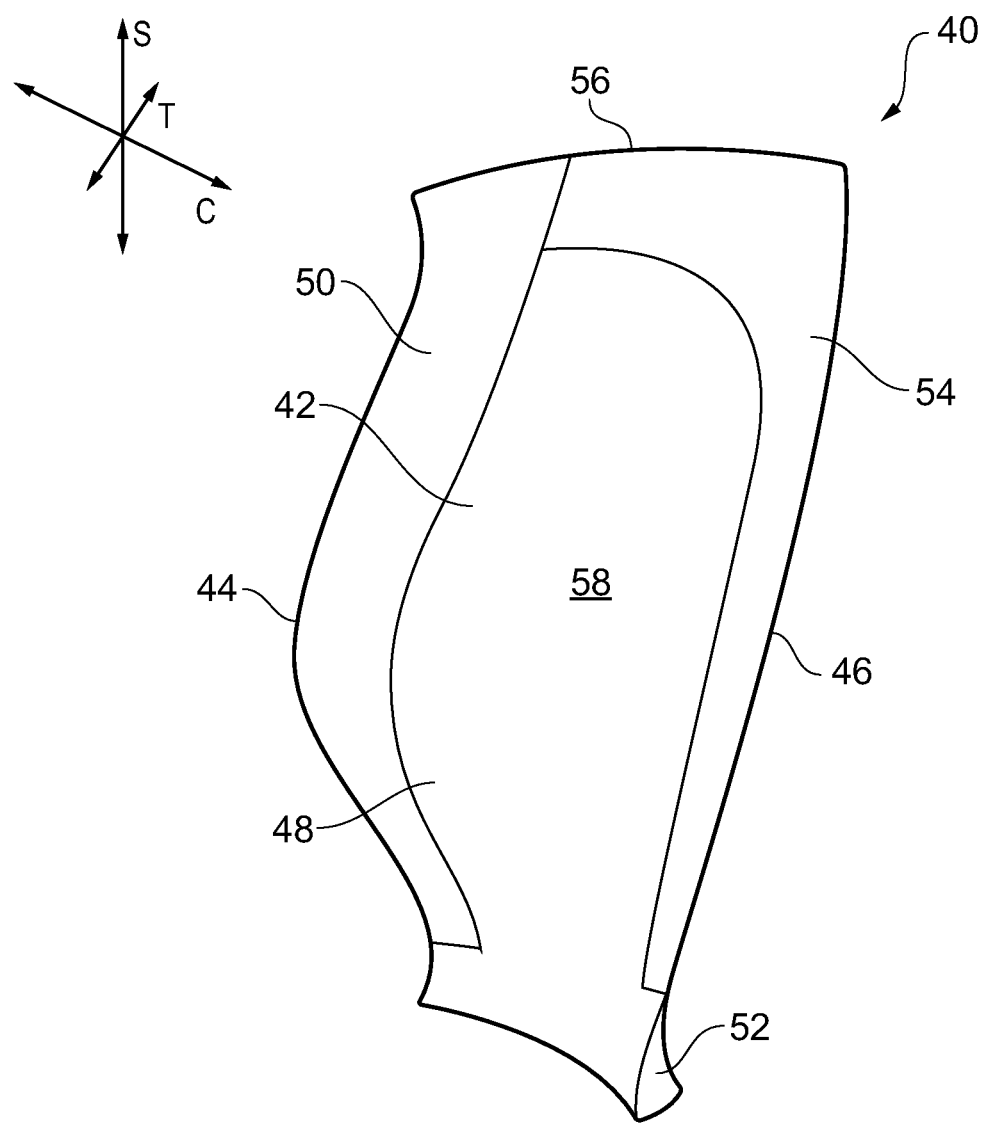
FIG. 2 is a perspective view of a fan blade.

Referring to FIG. 2, the fan blades 40 each comprise an aerofoil portion 42 having a leading edge 44, a trailing edge 46, a concave pressure surface wall 48 extending from the leading edge to the trailing edge and a convex suction surface wall extending from the leading edge to the trailing edge. The fan blade has a root 52 via which the blade can be connected to the hub. The fan blade has a tip 56 at an opposing end to the root. In the present application, a spanwise direction S refers to a direction that extends between the root of the blade and a tip of the blade; a chordwise direction C refers to a direction that extends from the leading edge of the blade to the trailing edge of the blade; and a thickness direction T refers to a direction that extends from the pressure surface of the blade to the suction surface of the blade.

The fan blade includes a body 58 made from an organic matrix composite material. In this example, the organic matrix composite material is a carbon fibre reinforced resin matrix. The body may also comprise reinforcement elements, by way of example only, the reinforcement elements may be stitches, tufts or pins. A metallic leading edge member 50 and a metallic trailing edge member 54 are provided at a forward end and rearward end, respectively, of the body and connect thereto.

The fan includes a first set of fan blades and a second set of fan blades. Blades of the first set and the second set are arranged around the hub of the fan, e.g. alternating or in groups of two or more. In the present example, the blades of the first set have the same aerodynamic profile as the blades of the second set.

That is, they have the same gas washed surface area, same gas washed shape, and same gas washed profile (or dimensions).

The difference between the first set of blades and the second set of blades is the mass of the leading edge member. The mass of the leading edge member may be altered in a number of different ways, for example the leading edge members may be made from different materials, or they may be constructed in a different manner, for example the leading edge member may include a varying number or volume of hollow regions.

Figure 3:
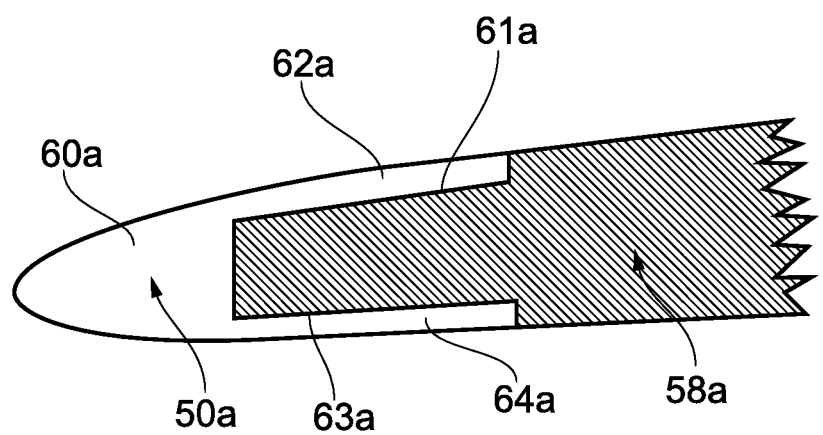
FIG. 3 is a partial cross section through a leading edge region of a fan blade of a first fan blade set.
Figure 4:
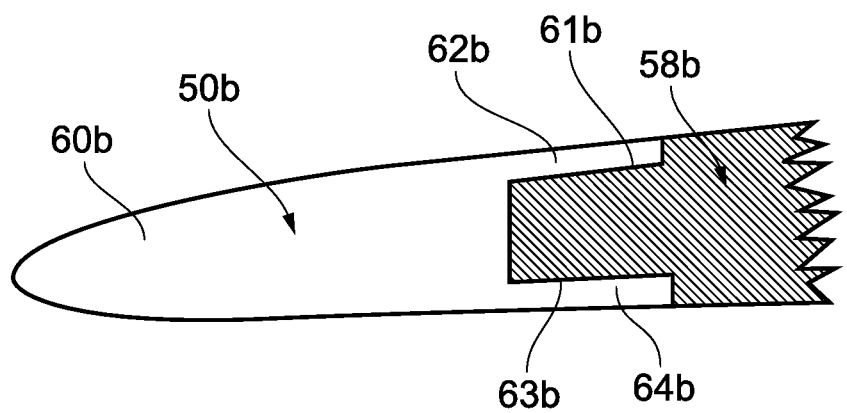
FIG. 4 is a partial cross section through a leading edge region of a fan blade of a second fan blade set.

Referring to FIGS. 3 and 4, in the present example, the mass of the leading edge member 50a of the first set of fan blades is arranged to be less than the mass of the leading edge member 50b of the second set of fan blades by making the volume of the leading edge member 50a less than the volume of the leading edge member 50b.

The leading edge members 50a, 50b include a forward portion 60a, 60b, a wing 62a, 62b that extends along a suction side of the blade, and a wing 64a, 64b that extends along a pressure side of the blade. The wings 62a, 62b, 64a, 64b extend along only a partial chordwise extent of the blade. As can be seen by comparing FIGS. 3 and 4, to reduce the volume of the leading edge member 50a of the first set of blades compared to the leading edge member 50b of the second set of blades, the forward portion 60a of the first set of blades may have a smaller volume than the forward portion 60b of the second set of blades. In this example, the forward portion 60a extends by a shorter chordal distance than the forward portion 60b. However, the overall dimensions of the blade remain the same, because the body 58a of the first set of blades is arranged to have a greater chordal extent than the body 58b of the second set of blades. In the presently described example, the chordal extent of the entire leading edge is the same for the first set of blades and the second set of blades. This is achieved because the leading edge member of the first set of blades has longer wings 62a, 64a than the leading edge member of the second set of blades 62b, 64b. The bodies 58a, 58b of the blades include recesses 61a, 63a, 61b, 63b for receiving the wings, such that a gas washed surface of the wings is substantially flush with a gas washed surface of the body.

Referring to FIGS. 5 and 6, in alternative embodiments, additionally or alternatively, the wings (only one wing 162b is illustrated in FIG. 6) of the leading edge member 150b of the second set of blades may be modified, compared to the wings (only one wing 162a is illustrated in FIG. 5) of the leading edge member 150a of the first set of blades, to provided additional mass to the wings of the leading edge members of the second set of blades. In this example, the blades 140a, 140b again have the same overall dimensions and shape regardless of whether they are in the first set of fan blades or the second set of fan blades, but the body 158b of the second set of blades has a different shape to the body 158a of the first set of blades, so as to accommodate the different wings.

In this example, the leading edge member 150b is larger in a radially inner portion 166 than a radially outer portion 168 compared to the leading edge member 150a. The radially inner portion extends from a mid-spanwise position 170 to the root 152 of the blade and the radially outer portion extends from the mid-spanwise position 170 to the tip 156 of the blade. The leading edge member is particularly larger in a root portion 172 of the blade. The root portion of the blade is proximal to and extends from the root, and has a spanwise length of approximately 30% of the full span of the blade.

Provision of a first set of blades and a second set of blades, the first set of blades having a leading edge member of a different mass to the leading edge member of the second set of blades allows for mistuning. Mistuning can result in increased flutter stability. In the described examples, the size of the body is adapted to accommodate a leading edge of different dimensions which means that flutter stability can be increased without penalising aerodynamic efficiency of the blade.

Arranging the leading edge members of the second set of fan blades to have increased mass near the root of the blades, means that additional material is being added in a region of the blade that in use has high strain energy and low kinetic energy, and this can further reduce flutter.

As will be appreciated, the wings and/or the forward portion may be arranged to be larger in a region proximal to the blade root.

Two different sets of fan blades have been described, but in alternative embodiments further different sets of fan blades may be provided.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fan for a gas turbine engine, the fan comprising:
   a first set of fan blades and a second set of fan blades arranged circumferentially around a hub,
   each of the fan blades of the first and second set comprises an organic matrix composite body and a leading edge member connected to the body,
   wherein the leading edge member of the first set of fan blades has a mass less than the leading edge member of the second set of fan blades,
   wherein a leading edge region of the first set of fan blades and a leading edge region of the second set of fan blades have a same exterior shape,
   wherein the mass of a radially inner portion of the leading edge member of the blades of the first set of blades is less than the mass of a radially inner portion of the leading edge member of the blades of the second set of blades, wherein the radially inner portion extends from a mid-spanwise location to a root of the blade, and
   wherein the mass of the leading edge member of the second set of fan blades is increased by providing a leading edge member with a greater volume in the region of greater mass than the fan blades of the first set.

2. The fan according to claim 1, wherein the blades of the first set and of the second set have the same gas washed surface area, shape and profile.

3. The fan according to claim 1, wherein the volume of the leading edge member of the first set of fan blades is smaller than the volume of the leading edge member of the second set of fan blades.

4. The fan according to claim 1, wherein the mass of a radially outer portion of the leading edge member of the first set is the same as the mass of a radially outer portion of the leading edge member of the second set, the radially outer portion of the leading edge member extends from a mid-spanwise location of the blade to a tip of the blade.

5. The fan according to claim 1, wherein the mass of a root portion of the leading edge member of the first set is less than the mass of a root portion of the leading edge member of the blades of the second set, the root portion extending from a spanwise location that is 30% of the total span of the blade to a root of the blade.

6. The fan according to claim 1, wherein the leading edge member of the first set and the second set comprises a forward portion that defines a leading edge of the blade, a wing that extends from the forward portion along a suction side of the blade and a wing that extends from the forward portion along a pressure side of the blade, and wherein the forward portion of the first set of blades has a lower mass or volume than the forward portion of the second set of blades.

7. The fan according to claim 1, wherein the leading edge member of the first set and the second set comprises a forward portion that defines a leading edge of the blade, a wing that extends from the forward portion along a suction side of the blade and a wing that extends from the forward portion along a pressure side of the blade, and wherein the wings of the first set of blades have a lower mass or volume than the wings of the second set of blades.

8. The fan according to claim 1, wherein the leading edge member is made from a metallic material.

9. The fan according to claim 8, wherein the leading edge member is made from steel, titanium or a titanium alloy.

10. The fan according to claim 1, wherein the body is made from a carbon reinforced resin matrix material.

11. The fan according to claim 1, wherein the blades of the first set and of the second set have the same gas washed surface area, shape and profile and wherein the volume of the leading edge member of the first set of fan blades is smaller than the volume of the leading edge member of the second set of fan blades.

12. A gas turbine engine comprising the fan according to claim 1.

* * * * *